US012387583B2

(12) United States Patent
Niemiec et al.

(10) Patent No.: US 12,387,583 B2
(45) Date of Patent: Aug. 12, 2025

(54) SYSTEM AND METHOD FOR NOTIFYING A GUARDIAN WHEN AN EXPECTED GESTURE FROM A MONITORED USER IS NOT RECEIVED

(71) Applicant: MOTOROLA SOLUTIONS, INC., Chicago, IL (US)

(72) Inventors: Pawel Niemiec, Cracow (PL); Pawel Wrobel, Gorenice (PL); Marcin Starzak, Skawina (PL); Oliwia Strzelec, Warsaw (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 132 days.

(21) Appl. No.: 18/544,921

(22) Filed: Dec. 19, 2023

(65) Prior Publication Data
US 2025/0201095 A1 Jun. 19, 2025

(51) Int. Cl.
G08B 23/00 (2006.01)
G06F 3/01 (2006.01)
G08B 21/02 (2006.01)

(52) U.S. Cl.
CPC .............. *G08B 21/02* (2013.01); *G06F 3/017* (2013.01)

(58) Field of Classification Search
CPC ................................ G08B 21/02; G06F 3/017
USPC ...................................................... 340/573.1
See application file for complete search history.

(56) References Cited

U.S. PATENT DOCUMENTS

| 8,937,551 | B2 | 1/2015 | Daniel |
| 9,983,021 | B1* | 5/2018 | Baird ................. G01C 21/3667 |
| 10,126,138 | B1* | 11/2018 | Farmer .................. G06Q 50/40 |
| 10,368,037 | B2 | 7/2019 | Malik et al. |
| 10,627,895 | B2 | 4/2020 | Kingsbury et al. |
| 10,853,897 | B2 | 12/2020 | Williams |
| 11,412,353 | B2 | 8/2022 | Williams et al. |
| 2014/0118543 | A1 | 5/2014 | Kerbs et al. |
| 2016/0364678 | A1* | 12/2016 | Cao ....................... G06Q 10/083 |
| 2021/0089048 | A1* | 3/2021 | Tran ...................... B60R 25/257 |
| 2022/0322086 | A1 | 10/2022 | Kerning et al. |

* cited by examiner

*Primary Examiner* — Tai T Nguyen

(57) ABSTRACT

Techniques for notifying a guardian when an expected gesture from a monitored user is not received are provided. A start point and a destination point are received from the monitored user. A route from the start point to the destination point that includes a gesture monitoring point is determined. The gesture monitoring point includes a camera capable of gesture detection. A selection of the gesture monitoring points to be monitored is received. An expected gesture for each of the selected gesture monitoring points is received. A guardian to be informed when the expected gesture is not received. The monitored user is tracked as they traverse the route. The guardian is notified when the expected gesture for the selection of gesture monitoring points is not detected from the monitored user when the monitored user passes through a field of view of the camera associated with the selected gesture monitoring points.

20 Claims, 7 Drawing Sheets

*500*

```
┌─────────────────────────────────────────────────────────────────────────┐
505 ─│ RECEIVE, FROM THE MONITORED USER, A START POINT AND A DESTINATION POINT │
   └─────────────────────────────────────────────────────────────────────────┘
                                       ↓
   ┌─────────────────────────────────────────────────────────────────────────┐
   │  DETERMINE A ROUTE FROM THE START POINT TO THE DESTINATION POINT FOR     │
510│  THE MONITORED USER, THE ROUTE INCLUDING AT LEAST ONE GESTURE            │
   │  MONITORING POINT, THE AT LEAST ONE GESTURE MONITORING POINT INCLUDING  │
   │              A CAMERA CAPABLE OF GESTURE DETECTION                      │
   │  ┌───────────────────────────────────────────────────────────────────┐  │
515│  │  RECEIVE, FROM THE MONITORED USER, A MODIFICATION TO THE DETERMINED│  │
   │  │                             ROUTE                                 │  │
   └──┴───────────────────────────────────────────────────────────────────┴──┘
```

505 — RECEIVE, FROM THE MONITORED USER, A START POINT AND A DESTINATION POINT

510 — DETERMINE A ROUTE FROM THE START POINT TO THE DESTINATION POINT FOR THE MONITORED USER, THE ROUTE INCLUDING AT LEAST ONE GESTURE MONITORING POINT, THE AT LEAST ONE GESTURE MONITORING POINT INCLUDING A CAMERA CAPABLE OF GESTURE DETECTION

515 — RECEIVE, FROM THE MONITORED USER, A MODIFICATION TO THE DETERMINED ROUTE

520 — RECEIVE, FROM THE MONITORED USER, A SELECTION OF THE GESTURE MONITORING POINTS TO BE MONITORED

525 — RECEIVE, FROM THE MONITORED USER, A SELECTION OF THE GESTURE MONITORING POINTS TO BE MONITORED

530 — PROVIDE A SUGGESTED EXPECTED GESTURE TO THE MONITORED USER FOR EACH OF THE SELECTED GESTURE MONITORING POINTS, WHEREIN THE SUGGESTED GESTURE IS BASED ON THE GESTURE DETECTION CAPABILITIES OF THE CAMERA OF THE GESTURE MONITORING POINT

535 — SELECT A PLURALITY OF EXPECTED GESTURES FOR EACH SELECTED GESTURE MONITORING POINT, WHEREIN DETECTION OF ANY ONE OF THE PLURALITY OF EXPECTED GESTURES AT THE SELECTED GESTURE MONITORING POINTS DOES NOT RESULT IN GUARDIAN NOTIFICATION

540 — RECEIVE, FROM THE MONITORED USER, A GUARDIAN TO BE INFORMED WHEN THE EXPECTED GESTURE FROM THE MONITORED USER AT THE SELECTED GESTURE MONITORING POINTS IS NOT RECEIVED

545 — SELECT A DIFFERENT GUARDIAN FOR AT LEAST ONE OF THE SELECTED GESTURE MONITORING POINTS (A)

*FIG. 5A*

SYSTEM AND METHOD FOR NOTIFYING A GUARDIAN WHEN AN EXPECTED GESTURE FROM A MONITORED USER IS NOT RECEIVED

BACKGROUND

Personal security is of utmost importance to most people. Based on subjective reviews of media reports, it appears that crime is ever increasing. One type of crime that is prevalent is attacks on people who are walking from one place to another (e.g. within a city, on a college campus, on a workplace campus, etc.). Often times people are making this journey alone, thus causing them to become vulnerable to attack (e.g. kidnapping, beating, robbery, rape, etc.).

To help mitigate this type of crime, various techniques have been developed. One technique employs a virtual escort. A traveler may inform a system of their start point and destination point. An expected time for travel between the points is provided or it can be computed based on the start and end points. Once a traveler begins their journey, the system begins a timer based on expected time of travel. The system may notify a guardian of the traveler when the traveler reaches their destination. If the traveler does not reach their destination prior to the timer expiring, the guardian is notified that something may have happened to the traveler. The guardian may then take corrective action (e.g. notify authorities, begin searching for the traveler, etc.).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIGS. 5A and 5B are an example flow diagram illustrating the techniques described herein.

Figure 1:
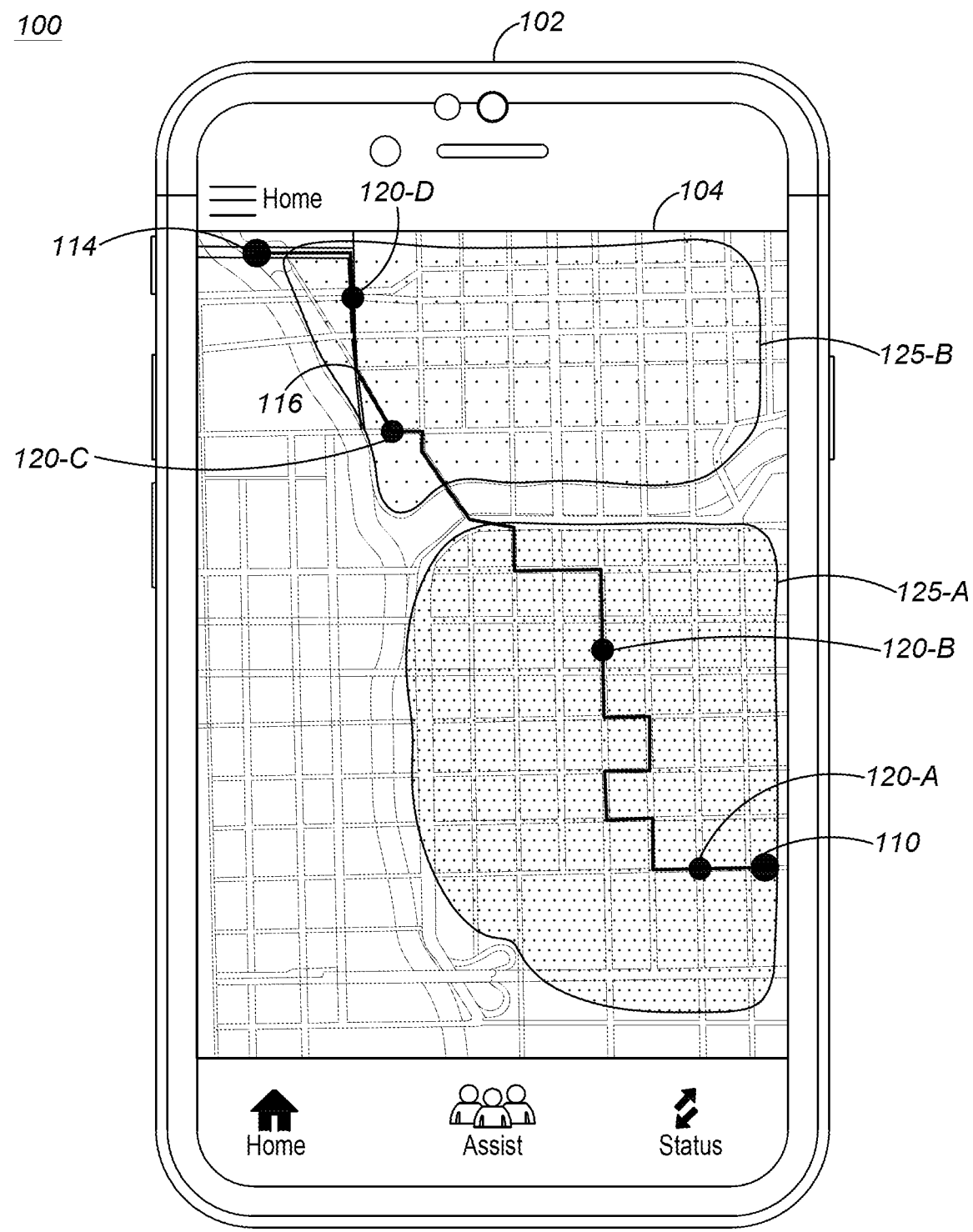
FIG. 1 is an example user interface for selecting a route and gesture monitoring points according to the techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Although the technique described above for notifying a guardian when a traveler has not arrived at their destination point by an expected time are better than no notification, there are significant problems with such techniques. The main problem with such techniques is that the guardian cannot be notified until the expected time of arrival has passed. For example, consider a traveler whose destination is approximately thirty minutes away. The traveler may begin the journey and immediately be attacked (e.g. kidnapped, etc.). The system would not be made aware of this for another thirty minutes (e.g. until the expected time of arrival has passed). Thus, there would be a delay in notifying the guardian. In many cases, time is of the essence in notifying a guardian that the traveler may be in danger.

The technique has a shortcoming in that the notification of a guardian may be to a guardian who is not ideally located. Consider the case where a traveler is on a multiple mile journey. The location of the guardian may not be appropriate for where the incident involving the traveler occurred. For example, assume the guardian is located near the destination point. If an incident with the traveler occurs near the starting point, not only will there be a delay in time for notifying the guardian (as described above), but now the guardian may have to travel all the way from the destination point to the starting point, adding additional delay.

The technique has a further shortcoming in that there is no monitoring the traveler along the route they are taking from the starting point to the destination. As the traveler moves from the starting point to the destination point, they may feel like they are in danger (e.g. someone is following them, etc.). There is no way for this information to be communicated with the guardian, because the guardian is not contacted until the traveler either reaches their destination or the expected time of arrival has passed.

There are other solutions that may include tracking the traveler with one or more cameras along the route from the starting point to the destination point. However, such techniques suffer from the shortcoming that even if the traveler is detected in the field of view of a camera as not currently being in danger, it cannot convey that the traveler may feel they are in danger (e.g. someone following them, etc.). Furthermore, the traveler may be forced by an attacker to stay on the route, such that nothing appears wrong to the tracking system. There are techniques for allowing the traveler to provide a gesture to the camera to indicate they are in danger. However providing a danger gesture has several shortcomings. First, the traveler in a scared state may forget to provide the danger gesture or may provide it in a location where they are not in the field of view of the camera. Second, and possibly more importantly, the traveler making an in danger gesture may cause an attacker to panic because they know they have been identified. Once made aware their presence has been observed, an attacker's behavior may become unpredictable.

Thus, there exists a need for an improved technical system, method, and device for providing security for a person traveling from a start point to a destination point. The techniques described herein overcome the problems described above individually and collectively.

The traveler, who will hereinafter also be referred to as a monitored user, will set a start point and a destination point with the system. The system may then determine a route for the user to take between the points. The system will generate the route taking into account locations along the route that are equipped with cameras that are able to detect gestures. These locations, also referred to as gesture monitoring locations, are presented to the monitored user.

The monitored user will then be prompted to select the gesture monitoring locations where gestures should be monitored. This selection could include all possible locations or some subset of those locations. For each selected location, the monitored user selects a gesture to be provided when the monitored user feels safe.

The monitored user is then allowed to select a guardian to be notified for each portion of the route. When it is determined that the monitored user is in danger at a particular gesture monitoring point, the guardian associated with the area including the particular gesture monitoring point is notified that there may be a problem with the user. The notified guardian can take appropriate action (e.g. notify authorities, travel to the gesture monitoring point, etc.). For purposes of the remainder of this description, a guardian is any person who is designated to be notified when there may be an issue with monitored user (e.g. expected gesture not received, etc.). Although described as a person, it should be understood that this is for ease of description only. A guardian could also be an organization (e.g. public safety first responders, etc.). For example, if an expected gesture is not received at a gesture monitoring location, the guardian may be the local police department. The local police department may then be notified.

Once the selections have been made, the monitored user may begin their journey. Upon arrival at each selected gesture monitoring point, the user may provide the previously selected gesture for that gesture monitoring point to indicate that everything is ok. If the user does not provide the selected gesture (e.g. they feel they are in danger, etc.) or the user does not appear at the gesture monitoring point within an estimated timeframe, the guardian associated with the area including that gesture monitoring point is notified.

A method for notifying a guardian when an expected gesture from a monitored user is not received is provided. The method includes receiving, from the monitored user, a start point and a destination point. The method also includes determining a route from the start point to the destination point for the monitored user, the route including at least one gesture monitoring point, the at least one gesture monitoring point including a camera capable of gesture detection. The method also includes receiving, from the monitored user, a selection of the gesture monitoring points to be monitored. The method also includes receiving, from the monitored user, an expected gesture for each of the selected gesture monitoring points. The method also includes receiving, from the monitored user, a guardian to be informed when the expected gesture from the monitored user at the selected gesture monitoring points is not received. The method also includes tracking the monitored user as they traverse the route. The method also includes notifying the guardian when the expected gesture for the selection of gesture monitoring points is not detected from the monitored user when the monitored user passes through a field of view of the camera associated with each of the selected gesture monitoring points.

In one aspect, the method further comprises providing a notification to the monitored user when the monitored user enters a field of view of the camera of one of the selected gesture monitoring points. In one aspect, the method further comprises receiving, from the monitored user, a modification to the determined route. In one aspect, the method further comprises providing a suggested expected gesture to the monitored user for each of the selected gesture monitoring points, wherein the suggested gesture is based on the gesture detection capabilities of the camera of the gesture monitoring point.

In one aspect, the method further comprises selecting a different guardian for at least one of the selected gesture monitoring points. In one aspect, the method further comprises estimating a timeframe when the monitored user should arrive at each selected gesture monitoring point and scanning for the expected gesture at each selected gesture monitoring point based on the estimated timeframe. In one aspect, the method further comprises selecting a plurality of expected gestures for each selected gesture monitoring point, wherein detection of any one of the plurality of expected gestures at the selected gesture monitoring points does not result in guardian notification.

A system for notifying a guardian when an expected gesture from a monitored user is not received is provided. The system comprises a processor and a memory coupled to the processor, the memory containing a set of instructions thereon that when executed by the processor cause the processor to receive, from the monitored user, a start point and a destination point. The instructions on the memory also cause the processor to determine a route from the start point to the destination point for the monitored user, the route including at least one gesture monitoring point, the at least one gesture monitoring point including a camera capable of gesture detection. The instructions on the memory also cause the processor to receive, from the monitored user, a selection of the gesture monitoring points to be monitored. The instructions on the memory also cause the processor to receive, from the monitored user, an expected gesture for each of the selected gesture monitoring points. The instructions on the memory also cause the processor to receive, from the monitored user, a guardian to be informed when the expected gesture from the monitored user at the selected gesture monitoring points is not received. The instructions on the memory also cause the processor to track the monitored user as they traverse the route. The instructions on the memory also cause the processor to notify the guardian when the expected gesture for the selection of gesture monitoring points is not detected from the monitored user when the monitored user passes through a field of view of the camera associated with each of the selected gesture monitoring points.

In one aspect, the instructions on the memory cause the processor to provide a notification to the monitored user when the monitored user enters a field of view of the camera of one of the selected gesture monitoring points. In one aspect, the instructions on the memory cause the processor to receive, from the monitored user, a modification to the determined route. In one aspect, the instructions on the memory cause the processor to provide a suggested expected gesture to the monitored user for each of the selected gesture monitoring points, wherein the suggested gesture is based on the gesture detection capabilities of the camera of the gesture monitoring point.

In one aspect, the instructions on the memory cause the processor to select a different guardian for at least one of the selected gesture monitoring points. In one aspect, the instructions on the memory cause the processor to estimate a timeframe when the monitored user should arrive at each selected gesture monitoring point and scan for the expected gesture at each selected gesture monitoring point based on the estimated timeframe. In one aspect, the instructions on the memory cause the processor to select a plurality of expected gestures for each selected gesture monitoring point, wherein detection of any one of the plurality of expected gestures at the selected gesture monitoring points does not result in guardian notification.

A non-transitory processor readable medium containing a set of instructions thereon for notifying a guardian when an expected gesture from a monitored user is not received is provided. The instructions on the medium, that when executed by a processor cause the processor to receive, from the monitored user, a start point and a destination point. The instructions on the medium also cause the processor to determine a route from the start point to the destination point for the monitored user, the route including at least one gesture monitoring point, the at least one gesture monitoring point including a camera capable of gesture detection. The instructions on the medium also cause the processor to receive, from the monitored user, a selection of the gesture monitoring points to be monitored. The instructions on the medium also cause the processor to receive, from the monitored user, an expected gesture for each of the selected gesture monitoring points. The instructions on the medium also cause the processor to receive, from the monitored user, a guardian to be informed when the expected gesture from the monitored user at the selected gesture monitoring points is not received. The instructions on the medium also cause the processor to track the monitored user as they traverse the route. The instructions on the medium also cause the processor to notify the guardian when the expected gesture for the selection of gesture monitoring points is not detected from the monitored user when the monitored user passes through a field of view of the camera associated with each of the selected gesture monitoring points.

In one aspect, the instructions on the medium cause the processor to provide a notification to the monitored user when the monitored user enters a field of view of the camera of one of the selected gesture monitoring points. In one aspect, the instructions on the medium cause the processor to receive, from the monitored user, a modification to the determined route. In one aspect, the instructions on the medium cause the processor to provide a suggested expected gesture to the monitored user for each of the selected gesture monitoring points, wherein the suggested gesture is based on the gesture detection capabilities of the camera of the gesture monitoring point.

In one aspect, the instructions on the medium cause the processor to select a different guardian for at least one of the selected gesture monitoring points. In one aspect, the instructions on the medium cause the processor to estimate a timeframe when the monitored user should arrive at each selected gesture monitoring point and scan for the expected gesture at each selected gesture monitoring point based on the estimated timeframe.

Each of the above-mentioned embodiments will be discussed in more detail below, starting with example user interfaces, followed by an illustration of processing blocks for achieving an improved technical method, device, and system for notifying a guardian when an expected gesture from a monitored user is not received, and concluding with architectures of device(s) which may implement the system.

Further advantages and features consistent with this disclosure will be set forth in the following detailed description, with reference to the figures.

FIG. 1 is an example user interface for selecting a route and gesture monitoring points according to the techniques described herein. Environment 100 may include a device 102 which provides a user interface to interact with a computing system that implements the techniques described herein. The device 102 may typically be a device such as a smartphone that includes the functionality generally associated with a smartphone. For example, the device 102 may be communicatively coupled with one or more networks (e.g. WiFi, LTE, 5G, satellite communications, etc.). The particular form of the network is unimportant. What should be understood is that the device 102 is utilized by a monitored user to communicate with external computing systems.

The device 102 may also include location features to provide the location of the device. For example, the device may be equipped with geographic positioning system (GPS) technology to identify the location on earth of the device. It should be noted that GPS is used in a generic manner and is not intended to imply any particular implementation. What should be understood is that the device is able to determine its own location, regardless of the specific technology used to do so.

The device 102 may include a display 104 that displays a user interface that the monitored user interacts with. In many cases, the display may be a touch sensitive display, and the user interacts with the display via a touch interface. It should be understood that a touch interface is only one example of an interface usable with the techniques described herein. A keyboard/mouse based interface or a voice interface may also be utilized. Furthermore, although the device has generally been described as a smart phone, the techniques described herein are not so limited. The techniques are equally applicable when the monitored user interface 104 is provided by a desktop computer, laptop computer, tablet, phablet, or any other computing device.

The monitored user may first be asked to provide a start point and a destination point for the journey. This information can be provided in any number of ways. For example, the start point could be determined by the device's 102 current GPS determined location. In some cases, the start point can be provided by the monitored user as an address. The start point may also be determined by the monitored user interacting with a map to indicate the start point (e.g. drop a pin at the start point, etc.).

Likewise the destination point may be determined by the monitored user entering a destination address. Just as with the start point, the monitored user may interact with a visual map to indicate the destination point (e.g. drop a pin at the destination point, etc.). In some cases, the monitored user may provide aliases for frequently used start and destination points. For example, if the monitored user frequently travels between their dorm and the library, aliases for those locations may be created. For example, when traveling between the dorm and library, the monitored user can simply provide the alias of "Dorm" and "Library" and the appropriate locations are retrieved. It should be understood that the specific techniques for providing start and destination points are relatively unimportant. Any technique available may be used to provide start and destination points.

Once the start and destination points are received, the system may determine a route between the start and destination point and display this route to the user. For example, the start point 110 and destination point 114 may be displayed on a map shown via the user interface 104. The actual route 116 to be traversed when going from the start point to the destination point may also be shown.

The determination of the route 116 between the starting point 110 and the destination point 114 can use any known routing techniques. There is one additional constraint placed on the routing in that the route will include at least one gesture monitoring point, described below. As shown in FIG.

1, gesture monitoring points 120-A-D are shown. It should be understood that the techniques described herein are not dependent on any particular number of gesture monitoring points along the route.

A gesture monitoring point is a location that is covered by the field of view of a camera that is capable of gesture recognition. For example, the camera may include known video analytics that can be used to detect gestures in the camera's field of view. In some cases, the camera may simply capture video and send the images to a backend server (e.g. cloud based, etc.) where the video analytics are performed. Regardless of where the analytics are performed, it should be understood that the gesture monitoring points are covered by cameras that can detect gestures.

In some cases, the monitored user may alter the route 116 determined by the system. For example, the monitored user may wish to make an intermediate stop (e.g. at a store, friend's house, etc.). As with currently well known mapping software, changes to a route determined by the system are well known. In the case where the monitored user alters the determined route, a new route (not shown) will be presented to the user. Gesture monitoring points along that new route (not shown) are also presented to the monitored user.

The monitored user is then able to select one or more of the gesture monitoring points 120 where gestures are to be expected. For example, the route that the monitored user may travel may include some portions that are very safe (e.g. right in front of the police station, etc.) and other portions that are less safe (e.g. passing by an apartment complex known for crime, etc.). The monitored user may select which gesture monitoring locations of the available gesture monitoring locations will actually have the gestures monitored. It should be noted that there is a lower limit of at least one gesture monitoring point being selected. At the other end of the range, the user is free to select all available gesture monitoring points.

The monitored user may then select different areas corresponding to the determined route 116. In the example shown in FIG. 1, two areas are specified. Area 125-A and area 125-B, which can be referred to as areas A and B. Each area encompasses some number of gesture monitoring points. In the example shown, area A includes gesture monitoring points 120-A, B, while area B includes gesture monitoring points 120-C, D. Although only two areas are described, this is for ease of description, rather than by way of limitation. There can be any number of areas designated with any number of gesture monitoring points contained therein. The purpose of the defined areas will be described in further detail below, with respect to FIG. 3.

Figure 2:
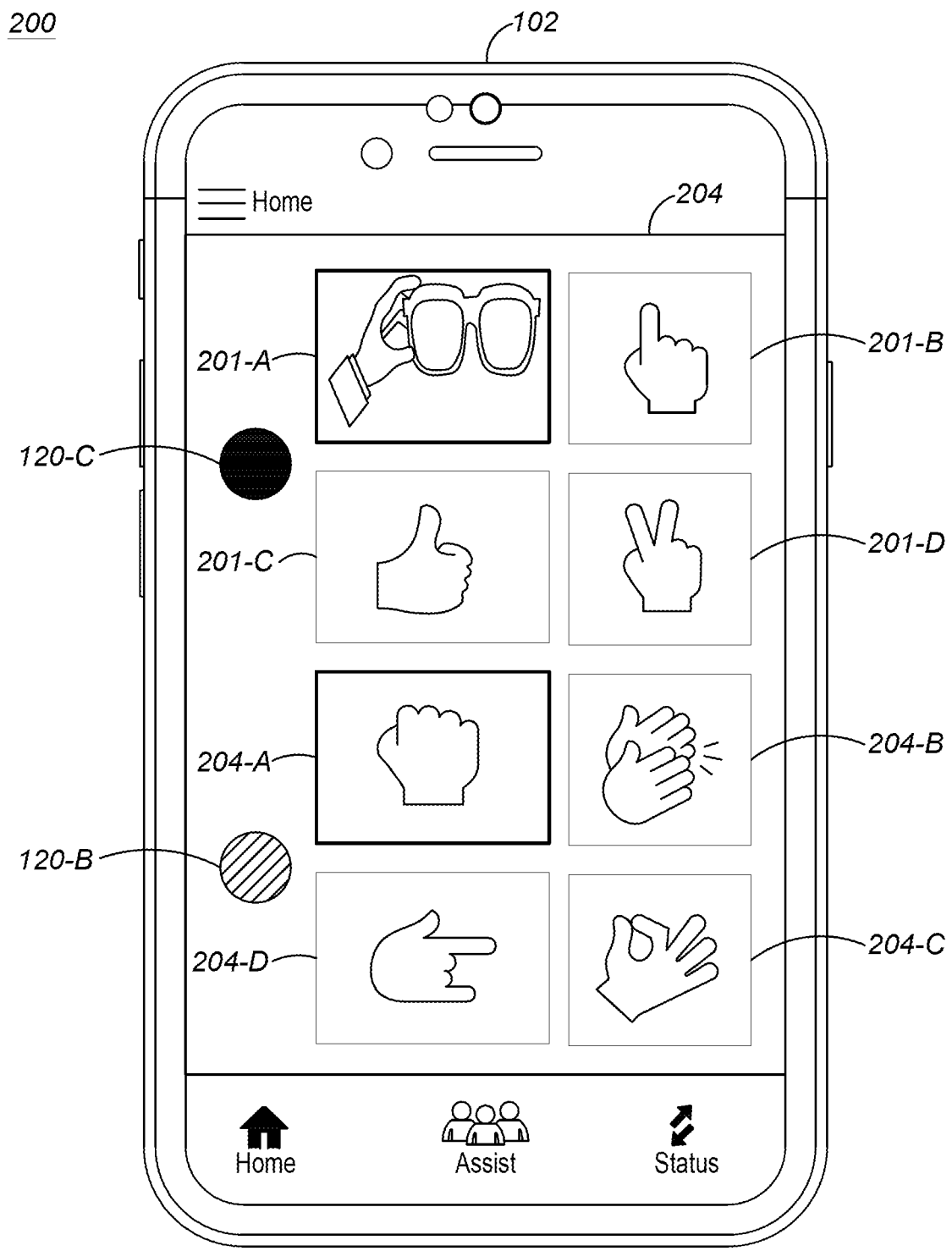
FIG. 2 is an example user interface for selecting a gesture to be performed at the selected gesture monitoring points.

FIG. 2 is an example user interface for selecting a gesture to be performed at the selected gesture monitoring points. Environment 200 may include a device, such as device 102 described above. The device may provide a user interface 204 through which the monitored user can select the specific gesture that should be performed at each gesture monitoring point that was selected, as was explained with respect to FIG. 1.

In some implementations, the system recommends specific gestures to be performed at a gesture monitoring point based on the gesture detection capabilities available at the gesture monitoring point. For example, in some cases, a gesture monitoring point may be equipped with a high-resolution camera and/or advanced video analytics such that it is able to detect fine grained gestures. For example, it can detect whether a person is holding up one finger, two fingers, etc. In other cases, a gesture monitoring point may be equipped with lower resolution cameras and/or less advanced video analytics such that it is only able to detect gross gestures. For example, it might be able to detect a first held high in the air, but would not be able to detect if any fingers were being held up in the first.

As should be clear, it does not make sense to allow a user to select a gesture that the camera at the selected gesture monitoring point cannot detect. As shown in FIG. 2, assume gesture monitoring points 120-B, C were selected by the monitored user. For each of the selected gesture monitoring points, the system provides four possible recommended gestures 201-A-D, 204-A-D for the user to select. The recommended gesture are based on the capabilities of the camera at that gesture monitoring point. In other words, only gestures the camera is capable of detecting are provided for the monitored user to select.

As shown in FIG. 2, the monitored user selects a gesture to be performed at each selected gesture monitoring point. In the example presented, gestures 201-A (i.e. touching glasses) and gesture 204-A (i.e. making a first) are selected. As will be explained in further detail below, when a monitored user passes through a specific gesture monitoring point, providing the gesture selected for that monitoring point will serve as an indication that everything is all right.

Although FIG. 2 has been presented with the selection of a single gesture for each gesture monitoring point, it should be understood that this was for ease of description and not by way of limitation. In an actually implementation, the monitored user may be allowed to select any number of the recommended gestures for each selected gesture monitoring point. If the user provides any one of the selected gestures, that would be an indication that everything is all right.

In addition, FIG. 2 has been presented with respect to the system providing the recommended gestures. In some implementations, the monitored user may provide a custom gesture. After verifying the camera at the selected gesture monitoring point is capable of detecting the custom gesture, that custom gesture may become the gesture associated with the monitoring point. It should be clear that the system may reject a custom gesture provided by a user for a selected gesture monitoring point if that point is not capable of detecting that gesture.

Figure 3:
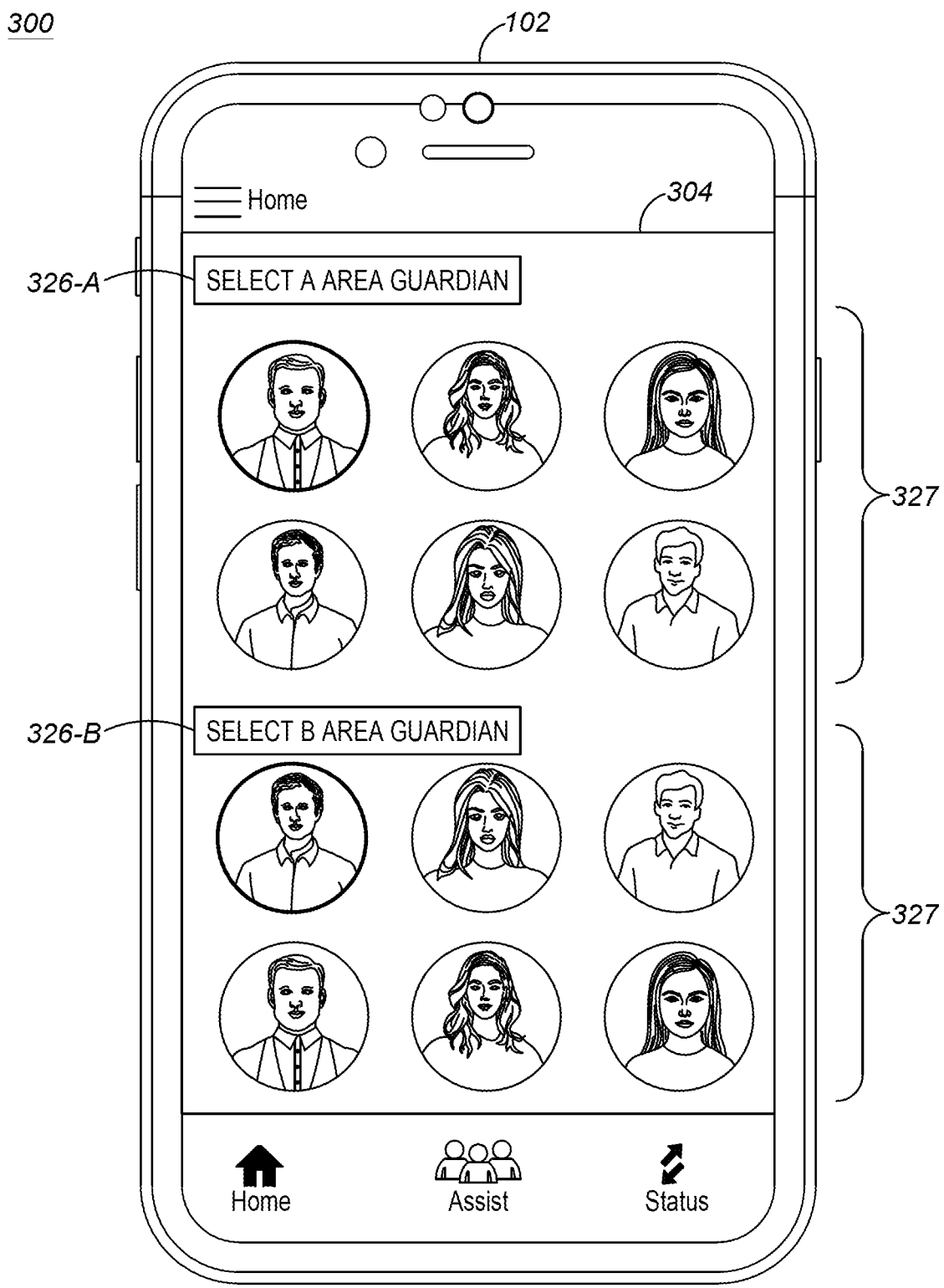
FIG. 3 is an example of a user interface for selecting which guardian to inform upon failure of receipt of an expected gesture.

FIG. 3 is an example of a user interface for selecting which guardian to inform upon failure to receipt of an expected gesture. Environment 300 may include a device, such as device 102 described above. The device may provide a user interface 304 through which the monitored user can select a specific guardian to be notified when an expected gesture at a selected gesture monitoring point is not received.

As explained above, the idea of notifying a guardian (e.g. a trusted person, etc.) when the monitored user is experiencing what could potentially be a dangerous situation is known. However, the selection of a single guardian may be problematic because the guardian can only be in a single place at a time. If the guardian is located near the beginning of the determined route and an incident occurs towards the end of the rout, it may take time for the guardian to arrive at the location of the incident. Likewise, if the guardian is located at the end of the determined route and an incident occurs at the beginning of the route, it will take time for the guardian to arrive at the incident location.

As mentioned above with respect to FIG. 1, the monitored user may select different areas 125-A, B along the determined route 116. Each of these areas may include one or more gesture monitoring points 120. The monitored user may then be prompted to select a guardian 326-A, B to be notified when an expected gesture is not received at a gesture monitoring point located within that area. The user may be presented with a list of possible guardians 327 to select from.

For example, in the determined route 116 depicted in FIG. 1, there is an area 125-A defined that includes gesture monitoring points 120-A, B. In user interface 304, the user may be prompted to select a guardian 326-A to be notified if an expected gesture is not received at gesture monitoring locations 120-A, B. The monitored user can also be prompted 326-B to select a guardian to be notified if an expected gesture is not received at gesture monitoring points 120-C, D included in area 125-B.

It should be understood that the monitored user may select the same guardian to be notified for more than one area up to an including all areas. It should also be understood that the monitored user may select multiple guardians to be notified for a given area. The techniques described herein do not create any limits on who can be selected as a guardian for an area. What should be understood is that different guardians maybe selected for areas along the determined route 116. The source of the list of possible guardians 327 may be provided by the monitored user. In some cases, the source for the list of possible guardians may be from the monitored user's device 102, such that any of the user's contacts could be selected as a guardian.

Figure 4:
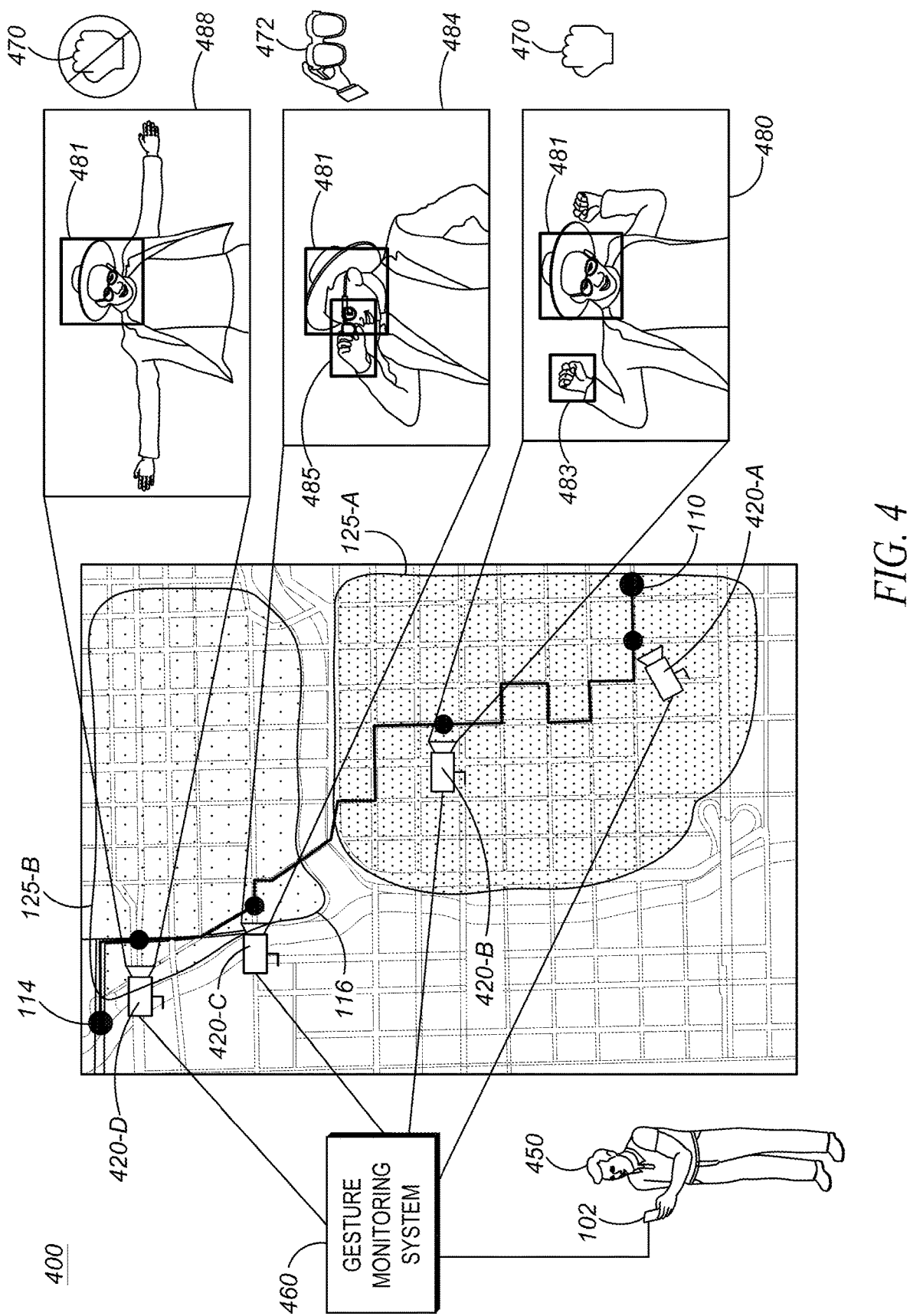
FIG. 4 is an example of operation of the system according to the techniques described herein.

FIG. 4 is an example of operation of the system according to the techniques described herein. The environment 400 may include a monitored user 450, a gesture monitoring system 460, and gesture monitoring cameras 420-A-D. The monitored user is a traveler whose movements will be tracked.

The gesture monitoring system 460 is a system that is used to implement the techniques described herein. An example of a device that may implement the gesture monitoring system is described with respect to FIG. 6. The gesture monitoring system may receive input from the monitored user 450 via a device such as device 102 described above.

The environment 400 may also include gesture monitoring cameras 420-A-D. The gesture monitoring cameras are cameras whose field of view includes the gesture monitoring points 120. In other words, the presence of a gesture monitoring camera 420 is what make a point on the route a possible gesture monitoring point. For purposes of the remainder of the description, gesture monitoring cameras and gesture monitoring points are used interchangeably.

In operation, the monitored user 450 may use the device 102 to provide the gesture monitoring system 460 a start point and a destination point. As explained above, the specific mechanism used to provide the start and destination locations are unimportant. The gesture monitoring system may then determine a route 116 between the start and destination points. As part of the route determination process, the gesture monitoring system will ensure that the route includes one or more gesture monitoring cameras 420.

In some implementations, the monitored user 450 may be given the opportunity to modify the determined route. If the route is modified, the gesture monitoring system 460 may identify different gesture monitoring cameras 420 that provide coverage over the modified route. The monitored user may then be given the opportunity to select those gesture monitoring points where gestures should actually be monitored. The selection of gesture monitoring points can include anywhere from one to all of the possible gesture monitoring points.

In this particular example, the monitored user 450 may select gesture monitoring cameras 420-B,C,D as the locations where gestures should be monitored to determine if an expected gesture is not received. According the present example, gesture monitoring camera 420-A, B are located in area A 125-A, while gesture monitoring cameras 420-C, D are located in area B 125-B. Although not shown, the monitored user may select a guardian to be notified when an expected gesture is not received. As explained above, there may be a different guardian selected for each area along the route 116.

The monitored user 450 may select a gesture for each of the selected gesture monitoring points. In this example, the user has selected a first 470 as the gesture to be expected at gesture monitoring locations 420-B,D and touching eyeglasses 472 as the gesture to be monitored at gesture monitoring location 420-C.

The monitored user 450 my then begin traversing the route 116. When the monitored user arrives at gesture monitoring camera 420-A, the system does not attempt to detect any expected gestures because that was not a point selected by the monitored user for expected gesture monitoring. The monitored user then continues along the route to gesture monitoring camera 420-B. The field of view of gesture monitoring camera 420-B is shown as element 480. In implementations, the face 481 of the monitored user will be recognized by the gesture monitoring camera to determine that the monitored person has arrived within the field of view of the camera. However, the techniques described herein are not limited to facial recognition. Further examples of techniques to detect when the monitored user has arrived within the field of view are described below.

The monitored user 450 may then provide a gesture 483. The gesture monitoring system 460 determines the gesture provided by the monitored user and compares it with the previously selected gesture. If there is a match, then that means the expected gesture for the gesture monitoring point has been received. In this example, the provided gesture is a first and that matches the selected first gesture 470.

The monitored user 450 may then proceed along route 116 to gesture monitoring camera 420-C. The field of view 484 of gesture monitoring camera 420-C may include the monitored user. The monitored user may again be identified via facial recognition 481. The user may provide a gesture that includes touching their glasses 485. Because this gesture matches the expected gesture 472 for this gesture monitoring point, there is no notification sent to the guardian.

The monitored user 450 may then proceed along the route 116 to gesture monitoring camera 420-D. Again, the field of view 488 of gesture monitoring camera 420-D may include the face 481 of the monitored user, which is used to determine that the monitored user is located within the field of view. In the present example, the expected gesture for gesture monitoring point 420-D is a first 470. As shown in field of view 488, the monitored user has not provided the expected gesture.

The gesture monitoring system 460 may then determine that an expected gesture has not been received from the monitored user 450 at a selected gesture monitoring point 420-D. The gesture monitoring system may then determine who the selected guardian(s) is for the area 125-B that includes gesture monitoring camera 420D. The identified guardian may then be notified.

It should be understood that the system described herein advantageously uses absence of an expected gesture to indicate that the monitored user 450 either is in danger or feels unsafe. In other systems, a user may be expected to provide a gesture indicating that they feel unsafe. Such systems are deficient for several reasons. First, when a user is nervous and feels unsafe, they may forget that they need to provide a gesture indicating they are in danger. Furthermore, in a system where the user makes a gesture signifying danger, the source of that danger (e.g. person following monitored user, etc.) is also made aware that their presence has been observed.

To aid in the understanding of the operation, several use cases will be provided. In the first, a student may be traveling between the library and the dormitory, a route expected to take thirty minutes. The route may traverse a park. The system may suggest three gesture monitoring points, one at the entrance to the park, one in the middle of the park, and one at the end of the park. The selected gesture for entering the park may be hand waiving, the gesture in the middle of the park may be touching their hair, and the gesture at the end may be touching their glasses. The user may also select guardian A as the guardian to be notified for the entering the park gesture monitoring point, while guardian B is selected for the other two points.

The student may enter the park and waive their hand. Because this gesture was expected, there is no notification sent to guardian A. While walking through the park, the student may feel they are in danger because someone is following them. The user may then walk through the middle of the park gesture monitoring point and not touch their hair. Because the expected gesture of touching hair is not received, guardian B, who is associated with the middle of the park gesture monitoring point is notified.

As a second use case, there may be a security guard patrolling a warehouse. The security guard may have a defined route with gesture monitoring points. At each gesture monitoring point, the expected gesture may be scratching their cheek. While patrolling, the security guard may become suspicious of something, but feels more manpower is needed prior to investigating. At the next gesture monitoring point, the security guard deliberately fails to scratch his cheek. This results in the guardian being notified. In the case, the guardian may be the warehouse security department as opposed to an individual person. Although it is also possible that the guardian may be an individual like a security guard supervisor.

As a third use case, the monitored user may take a jog around a campus. The user selects several gesture monitoring points along the determined route. As the user traverses the route they provide the expected gesture at each selected gesture monitoring point and nothing is sent to the guardian. At the next gesture monitoring point, the monitored user may not show up at all during the expected timeframe. Because the monitored user has not shown up at all, it is not possible for the expected gesture to be received. The system may then notify the guardian associated with the gesture monitoring point. The guardian may have personal information related to the monitored user (e.g. monitored user has diabetes and frequently has low blood sugar and passes out, etc.) because the guardian was selected by the monitored user. The guardian may then call first responders (e.g. call 911, etc.) to report the situation. The guardian is able to provide the additional information (e.g. user has potentially passed out from low blood sugar) to first responders.

Figure 5B:
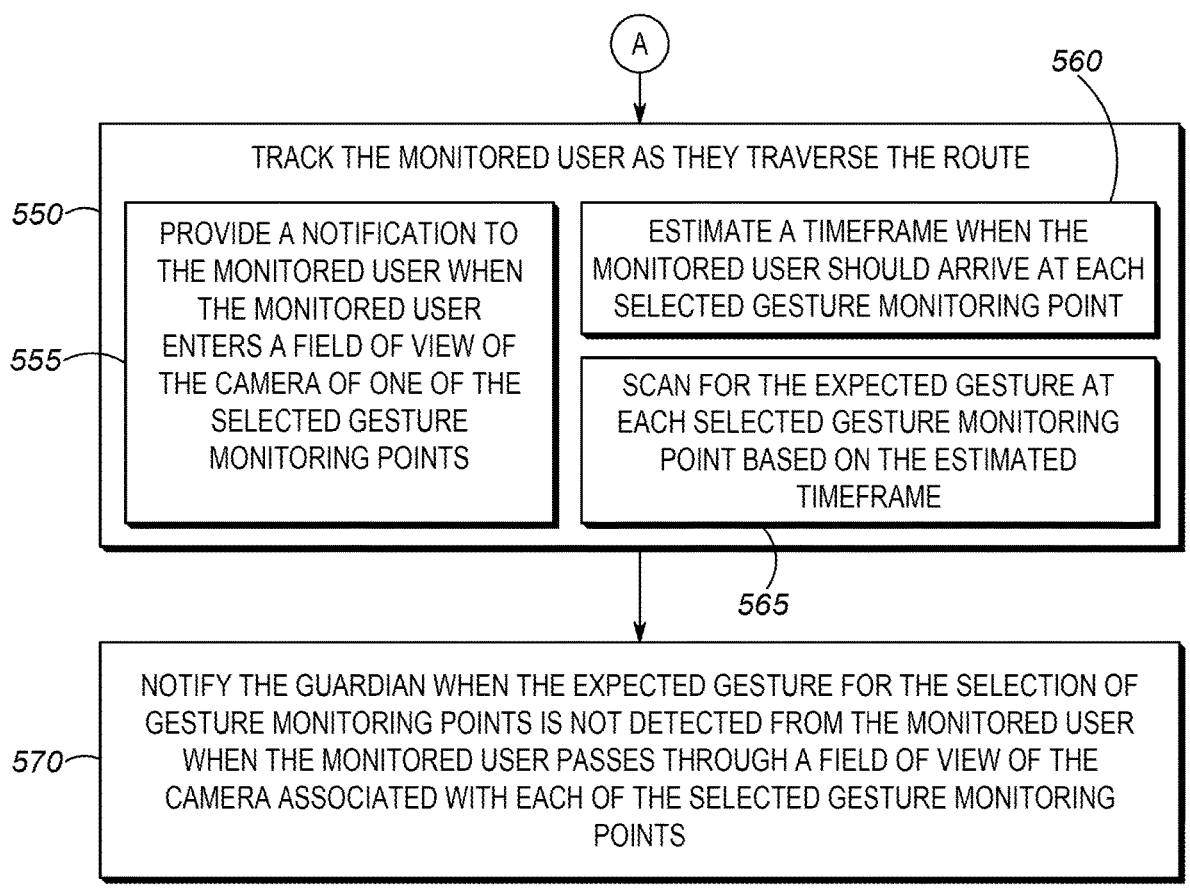

FIGS. 5A and 5B is an example flow diagram 500 illustrating the techniques described herein. In block 505, a start point and a destination point is received from the user. As explained above, the start point and destination point can be received from the user in any suitable manner. For example, addresses, dropping pins in locations on a map, current GPS coordinates, alias for commonly used locations, etc. What should be understood is that the monitored user tells the gesture monitoring system where the journey is intended to begin and where it is intended to end.

In block 510, a route from the start point to the destination point is determined for the monitored user. The route includes at least one gesture monitoring point. The at least one gesture monitoring point includes a camera capable of gesture detection. The specific techniques used for generating a route on a map between a start point and a destination point are well known (e.g. shortest path, avoid traffic, etc.). The techniques described herein determine a route such that the monitored user will pass at least one location that is equipped with a camera that is capable of detecting gestures. In many cases, the route may include more than one location where gestures can be monitored. It should be clear that the techniques described herein are not suitable for use if the route does not include at least one gesture monitoring point.

In block 515, a modification to the determined route is received from the monitored user. In some cases, the route determined by the gesture monitoring system may not be the one preferred by the user. For example, the route determined by system may go through an area that the monitored user would prefer not to go by. In other cases, the monitored user may choose to make a stop on the way between the start and destination point that is not included on the destination route. Regardless of the reason why, the monitored user may decide to alter the determined route. The techniques for modifying the determined route are known. For example, points on the route may be dragged to other points on the map to change the route. Intermediate addresses may be entered. Waypoints may be entered. What should be understood is the initially determined route may be modified.

The gesture monitoring system may analyze the modified route to ensure that it includes at least one gesture monitoring point. Any additional gesture monitoring locations based on the modified route can also be determined.

In block 520, a selection of the gesture monitoring points to be monitored is received from the monitored user. The user is not required to select every possible gesture monitoring point, because in some cases, selecting every point may become tedious. For example, consider a journey in an area that is well covered by gesture monitoring points. The monitored user would have to provide an expected gesture at each of those monitoring points. By allowing the user to select a subset of the gesture monitoring points, the burden on the monitored user is reduced. In addition, in some cases there may be no need for monitoring for expected gestures. As explained above, some portions of the journey may be inherently safe (e.g. passing in front of the police station, etc.). As such, requiring expected gestures in those inherently safe areas may be burdensome.

In block 525, an expected gesture for each of the selected gesture monitoring points may be received from the monitored user. The monitored user provides the gesture that is to be expected at each selected gesture monitoring point. In some cases the user may select the same gesture for every selected gesture monitoring point, while in other cases the user may select different gestures for each selected gesture monitoring point. The user may also use the same gesture for multiple gesture monitoring points. What should be understood is that the gesture monitoring system is made aware, for each selected gesture monitoring point, what gesture is to be expected from the monitored user.

In block 530, a suggested expected gesture is provided to the monitored user for each of the selected gesture monitoring points. The suggested gesture is based on the gesture detection capabilities of the camera of the gesture monitoring point. The gesture monitoring points may be equipped with cameras with different levels of gesture monitoring capabilities. For example based on the resolution of the camera, the placement of the camera, the field of view of the camera, the processing power available to the camera, etc. different levels of gesture recognition may be possible.

For example, a less sophisticated gesture recognition camera may only be able to detect gross movements, such as a first being help in the air, while a more capable camera may be able to detect finer movements, such as a number of fingers being held up. It would be ineffective to allow the monitored user to select a gesture for a gesture monitoring point that the camera at the point is not able to detect. By providing suggestions based on what the camera can actually detect, it is ensured that if the expected gesture is presented at the gesture monitoring point, it will be detected.

In block 535, a plurality of expected gestures is selected for each selected gesture monitoring point. The detection of any one of the plurality of expected gestures at the selected gesture monitoring points does not result in guardian notification. In other words, for a selected gesture monitoring point, multiple expected gestures can be selected. If any one of the multiple expected gestures is presented at the gesture monitoring point, this indicates to the gesture monitoring system that all is ok.

By allowing multiple gestures to be selected, the monitored user is protected from a bad actor (e.g. a stalker, etc.) from learning the expected gesture. For example, the user may select a set of expected gestures for each selected gesture monitoring location. When the user arrives at the location, they may select a random gesture from the selected set. Any observer would not be able to detect a discernable pattern of gestures.

In block 540, a guardian to be informed when the expected gesture from the monitored user at the selected gesture monitoring points is not received is received from the monitored user. As explained above, the monitored user is able to select the guardian that should be informed when an expected gesture is not received. For example, the guardian may be a parent a friend, a coworker, a teacher, a dormitory resident assistant, or any other person selected by the monitored user. In some cases the guardian may be an agency, such as law enforcement or campus security. What should be understood is that the user is able to select a guardian to be informed when an expected gesture is not received.

The techniques described herein are not dependent on any particular form of guardian notification. For example, the guardian could be notified via text message, e-mail, phone call, etc. What should be understood is that the guardian receives notification that the monitored user was on the way from the start point to the destination point and that at one of the selected gesture monitoring points an expected gesture was not received, indicating the monitored user may be in danger. The guardian may then take actions appropriate to the situation (e.g. notify the authorities, attempt to go to the location of the monitored user, etc.). The techniques described herein do not place any constraints on the actions the guardian may perform once informed that an expected gesture was not received.

In block 545, a different guardian is selected for at least one of the selected gesture monitoring points. As explained above, the gesture monitoring points may be grouped into areas (including areas as small as including only a single gesture monitoring point). A different guardian may then be selected for each gesture monitoring point based on different factors. For example, a guardian who is closest in proximity to the gesture monitoring location may be selected. What should be understood is that the monitored user is able to select which guardian is notified based on the specific gesture monitoring location.

In block 550, the monitored user is tracked as they traverse the route. There are many different ways that the monitored user can be tracked, as will be described in further detail below. What should be understood is that the gesture monitoring system tracks the monitored user, and when the monitored user appears within the field of view of the camera covering the selected gesture monitoring point, the system begins looking for the expected gesture.

In block 555, a notification is provided to the monitored user when the monitored user enters a field of view of the camera of one of the selected gesture monitoring points. Although it would be possible for the monitored user to remember the location of each of the selected gesture monitoring points, that might be burdensome for the monitored user. To alleviate this issue, the monitored user may be notified that they have reached a gesture monitoring point and that it is time to provide the expected gesture. In some cases the notification may be sent to a device (e.g. smartphone) associated with the user. For example, the notification could be a text message, a phone call, a notification from an app, etc. What should be understood is that the monitored user is made aware that the time to provide the expected gesture has arrived.

As mentioned above, there are many ways to track the monitored user. In block 560, a timeframe when the monitored user should arrive at each selected gesture monitoring point is estimated. For example, the system knows the distance between the selected gesture monitoring points. The system may also be provided with the speed the monitored user is travelling (this may be configured per individual user). With the distance and speed being known, it is possible to determine how long it should take for the monitored user to arrive at the selected gesture monitoring point.

In block 565, scanning for the expected gesture at each selected gesture monitoring point based on the estimated timeframe. In other words, when it is expected that the monitored user would be in the field of view of the camera covering the selected gesture monitoring point, the camera can then begin scanning for the expected gesture.

Although this is one possible technique, it does have the problem that the gesture monitoring point is only looking for the expected gesture, not necessarily the specific monitored user. As such, a bad actor who is able to determine the expected gesture may be able to provide the gesture to the gesture monitoring point.

To resolve this problem, the system may use facial recognition to determine when the monitored user is in the field of view of the camera at the gesture recognition point. For example, when the monitored user is setting up the route, they may provide a scan of their face. This image may then be sent to the gesture monitoring points to scan for the face. When the face is detected, the gesture monitoring point can then begin scanning for the expected gesture. It should be noted that privacy of the monitored user can be maintained as the system only needs to compare that the face of the person setting up the route is the same as the person providing the expected gesture. There is no need to personally identify the monitored user.

Performing facial detection on each of the gesture monitoring points continuously may require large amounts of processing power. To reduce the power required, a combination of the time based and facial recognition techniques may be used. For example, the system may wait until the approximate time that the monitored user should arrive in the field of view of the camera covering the gesture recognition point, and only then begin the facial recognition process.

The previous techniques described relied upon the gesture recognition system determining, on its own, when the monitored user has arrived within the field of view of the camera covering the selected gesture recognition point. In another example implementation, a user device, such as a smartphone, may be equipped with GPS. The user device may report the location of the monitored user to the gesture monitoring system. When the monitored user reports a location within the field of view of the camera covering the selected gesture monitoring point, the system can begin scanning for the expected gesture.

In block 570, the guardian is notified when the expected gesture for the selection of gesture monitoring points is not detected from the monitored user when the monitored user passes through a field of view of the camera associated with each of the selected gesture monitoring points. When the expected gesture is not received from the monitored user, this indicates that there may be a problem with the monitored user. The guardian may then be notified and take whatever corrective action is appropriate.

Furthermore, it should be noted that there may be different levels of notification provided to the guardian based on the specific circumstances regarding not detecting an expected gesture. For example, there may be a difference between the user being detected at the gesture monitoring point and not providing the expected gesture (e.g. forgot to provide the gesture, is nervous, etc.) vs the monitored user whose presence is not detected at the selected gesture monitoring point during the expected timeframe. The former case may indicate a less severe situation whereas the latter case may indicate something has occurred that is preventing the monitored user from even reaching the selected gesture monitoring point.

Figure 6:
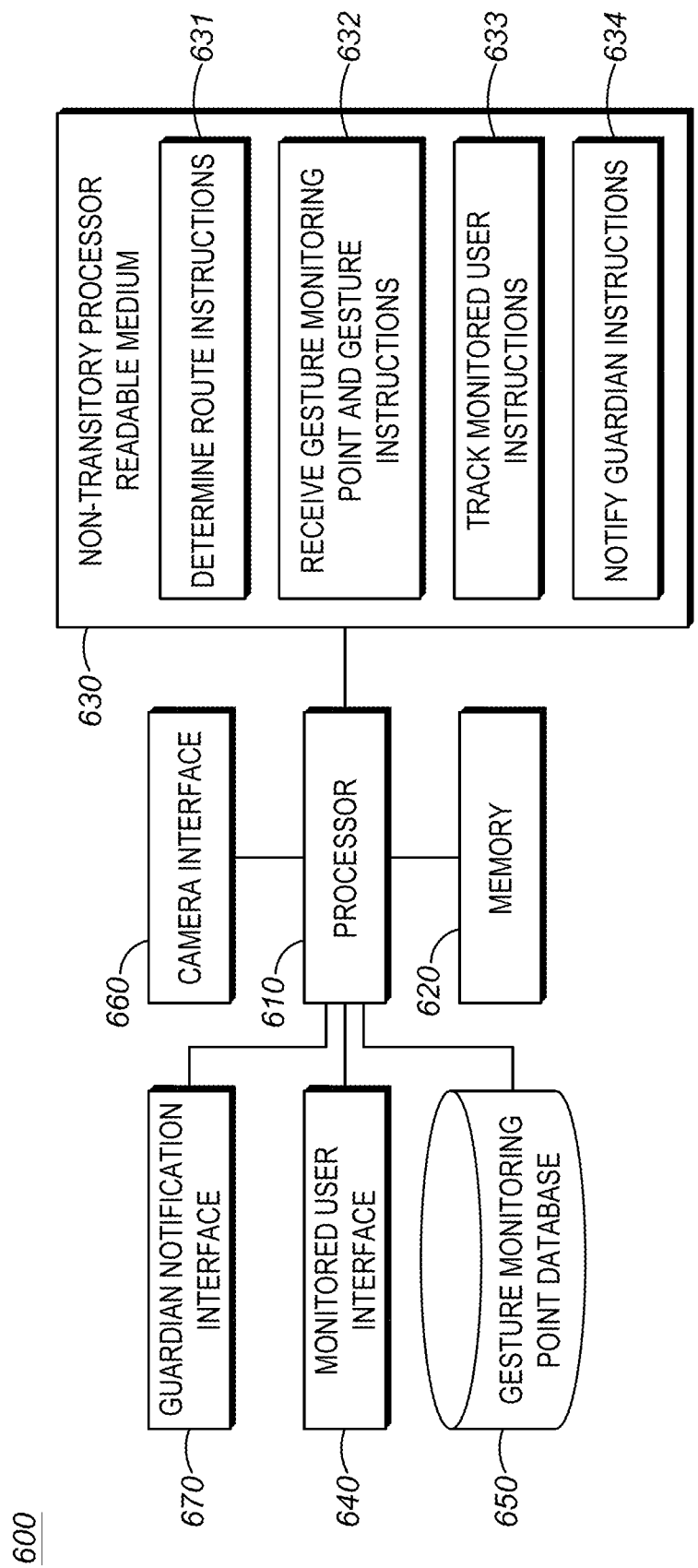
FIG. 6 is an example of a device that may implement the techniques described herein.

FIG. 6 is an example of a device 600 that may implement the techniques described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. users tracking, gesture detection, guardian notification, etc.) could be implemented on multiple devices that are communicatively coupled. FIG. 6 is not intended to imply that all the functionality described above must be implemented on a single device.

Device 600 may include processor 610, memory 620, non-transitory processor readable medium 630, monitored user interface 640, gesture monitoring point database 650, camera interface 660, and guardian notification interface 670.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include determine route instructions 631. The determine route instructions 631 may cause the processor to utilize the monitored user interface 640 to receive start and destination points from the user. The Monitored user interface 640 may allow the processor to communicate with the user input device, such as a smartphone, to receive input from the monitored user.

The determine route instructions 631 may cause the processor to determine a route for the monitored user that includes gesture monitoring points. The processor may access gesture monitoring point database 650 to determine the location of available gesture monitoring points. The determine route instructions 631 are described throughout the specification generally, including places such as the description of blocks 505-515.

The medium 630 may include receive gesture monitoring point and gesture instructions 632. The receive gesture monitoring point and gesture instructions 632 may cause the processor to receive, via the monitored user interface 640, a selection of gesture monitoring points where gestures are expected to be received. The selection of specific gestures to be received at those selected gesture monitoring points is also received from the monitored user. The receive gesture monitoring point and gesture instructions 632 631 are described throughout the specification generally, including places such as the description of blocks 520-535.

The medium 630 may include track monitored user instructions 633. The track monitored user instructions 633 may cause the processor to utilize the camera interface 660 to monitor cameras whose field of view includes the selected gesture monitoring points as the monitored user traverses the determined route. The processor may determine if the expected gesture is received at each camera via indications received from the camera interface 660. The track monitored user instructions 633 are described throughout the specification generally, including places such as the description of blocks 550-565.

The medium 630 may include notify guardian instructions 634. The notify guardian instructions 634 may cause the processor to receive a selection of guardians from the monitored user via the monitored user interface 640. When an expected gesture is not received, the selected guardian may be notified via the guardian notification interface 670. The guardian notification interface may be an interface to a communications system that allows the processor to send text, email, phone, etc. messages to the guardian. The notify guardian instructions 634 are described throughout the specification generally, including places such as the description of blocks 540, 545, and 570.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind.

Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot track a user with cameras, automatically detect the presence or absence of a gesture within a field of view of the camera using video analytics, determine a route including gesture monitoring points, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for notifying a guardian when an expected gesture from a monitored user is not received comprising:
   receiving, from the monitored user, a start point and a destination point;
   determining a route from the start point to the destination point for the monitored user, the route including at least one gesture monitoring point, the at least one gesture monitoring point including a camera capable of gesture detection;
   receiving, from the monitored user, a selection of the gesture monitoring points to be monitored;
   receiving, from the monitored user, an expected gesture for each of the selected gesture monitoring points;
   receiving, from the monitored user, a guardian to be informed when the expected gesture from the monitored user at the selected gesture monitoring points is not received;
   tracking the monitored user as they traverse the route; and
   notifying the guardian when the expected gesture for the selection of gesture monitoring points is not detected from the monitored user when the monitored user passes through a field of view of the camera associated with each of the selected gesture monitoring points.

2. The method of claim 1 further comprising:
   providing a notification to the monitored user when the monitored user enters a field of view of the camera of one of the selected gesture monitoring points.

3. The method of claim 1 further comprising:
   receiving, from the monitored user, a modification to the determined route.

4. The method of claim 1 further comprising:
   providing a suggested expected gesture to the monitored user for each of the selected gesture monitoring points, wherein the suggested gesture is based on the gesture detection capabilities of the camera of the gesture monitoring point.

5. The method of claim 1 further comprising:
   selecting a different guardian for at least one of the selected gesture monitoring points.

6. The method of claim 1 wherein tracking the monitored user as they traverse the route further comprises:
   estimating a timeframe when the monitored user should arrive at each selected gesture monitoring point; and
   scanning for the expected gesture at each selected gesture monitoring point based on the estimated timeframe.

7. The method of claim 1 further comprising:
   selecting a plurality of expected gestures for each selected gesture monitoring point, wherein detection of any one of the plurality of expected gestures at the selected gesture monitoring points does not result in guardian notification.

8. A system for notifying a guardian when an expected gesture from a monitored user is not received comprising:
a processor; and
a memory coupled to the processor, the memory containing a set of instructions thereon that when executed by the processor cause the processor to:
receive, from the monitored user, a start point and a destination point;
determine a route from the start point to the destination point for the monitored user, the route including at least one gesture monitoring point, the at least one gesture monitoring point including a camera capable of gesture detection;
receive, from the monitored user, a selection of the gesture monitoring points to be monitored;
receive, from the monitored user, an expected gesture for each of the selected gesture monitoring points;
receive, from the monitored user, a guardian to be informed when the expected gesture from the monitored user at the selected gesture monitoring points is not received;
track the monitored user as they traverse the route; and
notify the guardian when the expected gesture for the selection of gesture monitoring points is not detected from the monitored user when the monitored user passes through a field of view of the camera associated with each of the selected gesture monitoring points.

9. The system of claim 8 further comprising instructions that cause the processor to:
provide a notification to the monitored user when the monitored user enters a field of view of the camera of one of the selected gesture monitoring points.

10. The system of claim 8 further comprising instructions that cause the processor to:
receive, from the monitored user, a modification to the determined route.

11. The system of claim 8 further comprising instructions that cause the processor to:
provide a suggested expected gesture to the monitored user for each of the selected gesture monitoring points, wherein the suggested gesture is based on the gesture detection capabilities of the camera of the gesture monitoring point.

12. The system of claim 8 further comprising instructions that cause the processor to:
select a different guardian for at least one of the selected gesture monitoring points.

13. The system of claim 8 wherein tracking the monitored user as they traverse the route further comprises instructions that cause the processor to:
estimate a timeframe when the monitored user should arrive at each selected gesture monitoring point; and
scan for the expected gesture at each selected gesture monitoring point based on the estimated timeframe.

14. The system of claim 8 further comprising instructions that cause the processor to:
select a plurality of expected gestures for each selected gesture monitoring point, wherein detection of any one of the plurality of expected gestures at the selected gesture monitoring points does not result in guardian notification.

15. A non-transitory processor readable medium containing a set of instructions thereon for notifying a guardian when an expected gesture from a monitored user is not received, that when executed by a processor cause the processor to:
receive, from the monitored user, a start point and a destination point;
determine a route from the start point to the destination point for the monitored user, the route including at least one gesture monitoring point, the at least one gesture monitoring point including a camera capable of gesture detection;
receive, from the monitored user, a selection of the gesture monitoring points to be monitored;
receive, from the monitored user, an expected gesture for each of the selected gesture monitoring points;
receive, from the monitored user, a guardian to be informed when the expected gesture from the monitored user at the selected gesture monitoring points is not received;
track the monitored user as they traverse the route; and
notify the guardian when the expected gesture for the selection of gesture monitoring points is not detected from the monitored user when the monitored user passes through a field of view of the camera associated with each of the selected gesture monitoring points.

16. The medium of claim 15 further comprising instructions that cause the processor to:
provide a notification to the monitored user when the monitored user enters a field of view of the camera of one of the selected gesture monitoring points.

17. The medium of claim 15 further comprising instructions that cause the processor to:
receive, from the monitored user, a modification to the determined route.

18. The medium of claim 15 further comprising instructions that cause the processor to:
provide a suggested expected gesture to the monitored user for each of the selected gesture monitoring points, wherein the suggested gesture is based on the gesture detection capabilities of the camera of the gesture monitoring point.

19. The medium of claim 15 further comprising instructions that cause the processor to:
select a different guardian for at least one of the selected gesture monitoring points.

20. The medium of claim 15 wherein tracking the monitored user as they traverse the route further comprises instructions that cause the processor to:
estimate a timeframe when the monitored user should arrive at each selected gesture monitoring point; and
scan for the expected gesture at each selected gesture monitoring point based on the estimated timeframe.

* * * * *